US007827609B2

(12) United States Patent
Hong et al.

(10) Patent No.: US 7,827,609 B2
(45) Date of Patent: Nov. 2, 2010

(54) METHOD FOR TRACING-BACK IP ON IPV6 NETWORK

(75) Inventors: Choong-Seon Hong, Yongin-si (KR); Myung-Soo Kang, Seoul (KR); Sang-Hyun Choi, Seoul (KR)

(73) Assignee: Industry Academic Cooperation Foundation of Kyunghee University, Gyeonggi-do (KR)

( * ) Notice: Subject to any disclaimer, the term of this patent is extended or adjusted under 35 U.S.C. 154(b) by 912 days.

(21) Appl. No.: 11/425,581

(22) Filed: Jun. 21, 2006

(65) Prior Publication Data

US 2007/0157314 A1    Jul. 5, 2007

(30) Foreign Application Priority Data

Dec. 30, 2005   (KR) ................. 10-2005-0135741

(51) Int. Cl.
*G06F 12/14*   (2006.01)
(52) U.S. Cl. .................. 726/23; 726/22; 726/11; 726/3; 726/15; 726/12; 709/223; 709/224; 709/238
(58) Field of Classification Search ............... 726/3, 726/11–15, 22–23; 713/150–152; 709/223–224, 709/238
See application file for complete search history.

(56) References Cited

U.S. PATENT DOCUMENTS

| 6,829,230 B1* | 12/2004 | Tiuri ..................... 370/351 |
| 2002/0093954 A1* | 7/2002 | Weil et al. ............... 370/389 |
| 2005/0122955 A1* | 6/2005 | Lin et al. ................. 370/351 |

OTHER PUBLICATIONS

Henry C.J. Lee, On the Issues of IP traceback for IPv6 and Mobile IPv6, 2003, IEEE.*

* cited by examiner

*Primary Examiner*—Taghi T Arani
(74) *Attorney, Agent, or Firm*—Lowe Hauptman Ham & Berner, LLP

(57) ABSTRACT

Provided is a method for tracing-back an IP using marking information of a router stored on a hop-by-hop option header, which is one of IPv6 extension headers. According to the method, an attack made by an attacker is detected on the IPv6 network. If the attack is detected, information stored on a hop-by-hop option header of a packet received through the IPv6 network and marked by a router through which the packet has passed is extracted. After that, a reception path of the received packet is reconstructed and an IP of the attacker is back-traced using the extracted marking information.

4 Claims, 11 Drawing Sheets

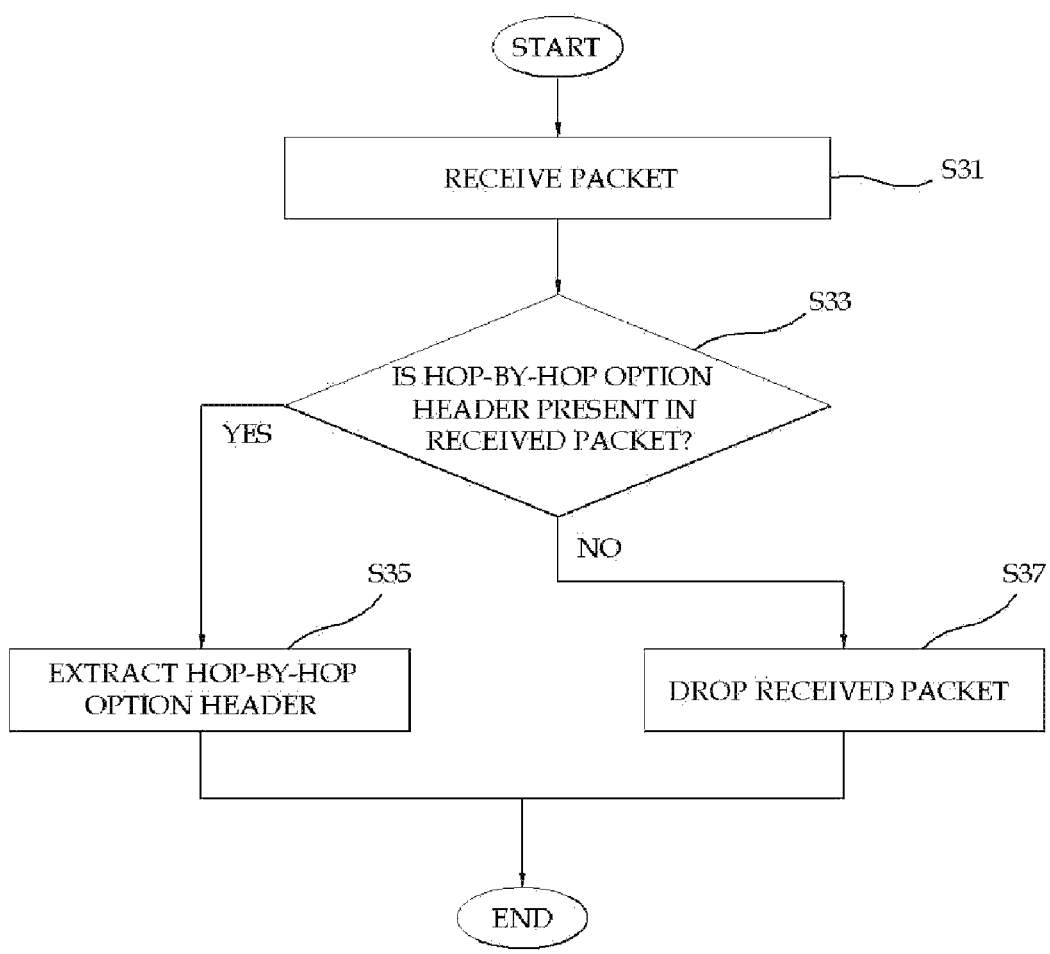

METHOD FOR TRACING-BACK IP ON IPV6 NETWORK

RELATED APPLICATIONS

The present application is based on, and claims priority from, Korean Application Number 10-2005-0135741, filed Dec. 30, 2005, the disclosure of which is hereby incorporated by reference herein in its entirety.

BACKGROUND OF THE INVENTION

1. Field of the Invention

The present invention relates to a method for tracing-back an Internet protocol (IP) on an Internet protocol version 6 (IPv6) network, and more particularly, to a method for tracing-back an IP using marking information of a router stored on a hop-by-hop option header, which is one of IPv6 extension headers.

2. Description of the Related Art

The Internet provides advantages such as exchange of various information without limitation of place and time, but disadvantages such as hacking of a system, information leakage, illegal intrusion, and distribution of a malignant virus are gradually increased as distribution systems increase and the Internet is widely used.

A representative example of the disadvantages caused by the Internet is denial of service (DoS), which rapidly exhausts resources of a host and a network through distributed attacks to generate reduction or denial of service performance. The above-described attack pattern is easy to realize using an attack program on the Internet, but difficult to defence and trace, because transmission control protocol (TCP)/Internet protocol (IP) protocol does not provide a security structure that can deal with the DoS attack. A DoS attacker can easily change a transmitter address of an IP packet and send the changed address to a system of a victim (referred to as "spoofing"). In this case, since an IP address contained in the transmitted IP packet is not an IP address of a real attacker who has actually transmitted the IP packet, it is difficult to trace an IP of the real attacker of the spoofed packet using only the transmitter IP address.

FIG. 1 shows an examplary attack type of distributed denial of services (DDoS) made on a victim's host on a network. Referring to FIG. 1, attackers 1 to 3 make DDoS attacks on the victim's host. Actually, the DDoS attacks may be performed by numerous attackers, and thus an amount of traffic received by the victim's host may be enormous. When a measure is not taken rapidly against the attack, the victim's host may not provide service any more.

To prevent the above-described DDos attack, a passive defence such as conventional fire wall and intrusion detection system has been employed but it does not solve a fundamental problem. Therefore, an active technology for fining out an attacker and removing a fundamental threatening factor is required. A technology for tracing-back IP is studied to accurately find out a source of an attack. Currently, a variety of technologies for tracing-back an IP are proposed. The technologies for tracing-back the IP include a probabilistic packet marking (PPM), Internet control message protocol (ICMP), and hash-based tracing-back.

FIG. 2 illustrates an IPv4 network used for explaining the probabilistic packet marking. Referring to FIG. 2, the IPv4 network includes an attacker and a plurality of routers R1 to R10 transmitting a packet from the attacker to a victim's host. When the packet transmitted from the attacker is delivered to the victim's host via the routers R1, R2, R7, and R10, each router through which the packet has passed marks an IP address of the router itself on a changeable field, e.g., an identification (ID) field contained in an IP header of the packet. Since enormous overhead occurs when each router marks an IP address of the router itself on all packets, the router performs sampling of the packets with a predetermined probability and perform marking on the sampled packets in order to maintain a smooth operation of network.

FIG. 3 is a flowchart explaining a method for tracing-back an attacker's IP on an IPv4 network using PPM.

When a huge amount of packets is instantly transmitted to a victim's host and thus overload occurs on an IPv4 network, an agent managing the router R10 connected to the victim's host detects a DDoS attack (operation 1). When the DDoS attack is detected, an ID field contained in a header of a received packet is analyzed (operation 3). When recording information on a packet, a router records the information on the ID field of the packet header. Since a probability that the ID field representing sameness of a packet is used for division of an IP header is only about 0.25%, an IP address of a router is marked on the ID field. The ID field includes a 5-bit distance field and an 11-bit edge field. The distance field represents a distance from a victim's host to a router that performs marking, and the edge field represents an address of a router that performs marking. A 32-bit router address is encrypted into 11 bits using a hash function and then recorded on the edge field.

A path through which an attack packet is received is reconstructed using the router address contained in the edge field, and the distance from a victim's host to a router that performs marking contained in the distance field (operation 5). An IP of an attacker's host is back-traced using a reception path of the reconstructed packet (operation 7).

The above-described method for tracing-back an IP using PPM on the IPv4 provides a method for tracing-back an IP of an attacker's host using an ID field of an IP header. However, since a header structure of IPv6 is different from that of IPv4, the method for tracing-back an IP using PPM on the IPv4 cannot be directly used on an IPv6 network.

SUMMARY OF THE INVENTION

The present invention provides a method for tracing-back an IP of an attacker's host using PPM on the IPv6.

According to an aspect of the present invention, there is provided a method for tracing-back an IP on an IPv6 network, the method including: detecting an attack made by an attacker on the IPv6 network; if the attack is detected, extracting information stored on a hop-by-hop option header of a packet received through the IPv6 network and marked by a router through which the packet has passed; and reconstructing a reception path of the received packet and tracing-back an IP of the attacker using the extracted marking information.

The method may further include: if the reception path of the received packet is not reconstructed, transmitting a message for requesting a router whose marking information is not obtained for routing information; receiving the routing information transmitted from the router in response to the request message; and reconstructing a reception path using marking information of the router on the basis of the received routing information.

The method may further include: if a size of the received packet is the same as a PMTU (path maximum transmission unit) of the reception path, judging whether a hop-by-hop option header is present in the received packet; and if the hop-by-hop option header is absent in the received packet, destroying the received packet.

BRIEF DESCRIPTION OF THE DRAWINGS

The above and other features and advantages of the present invention will become more apparent by describing in detail exemplary embodiments thereof with reference to the attached drawings in which:

FIG. 11 is a flowchart explaining in more detail a method for receiving a packet used for tracing-back a reception path according to PMTUD.

DETAILED DESCRIPTION OF THE INVENTION

The present invention will now be described more fully with reference to the accompanying drawings, in which exemplary embodiments of the invention are shown.

Figure 1:
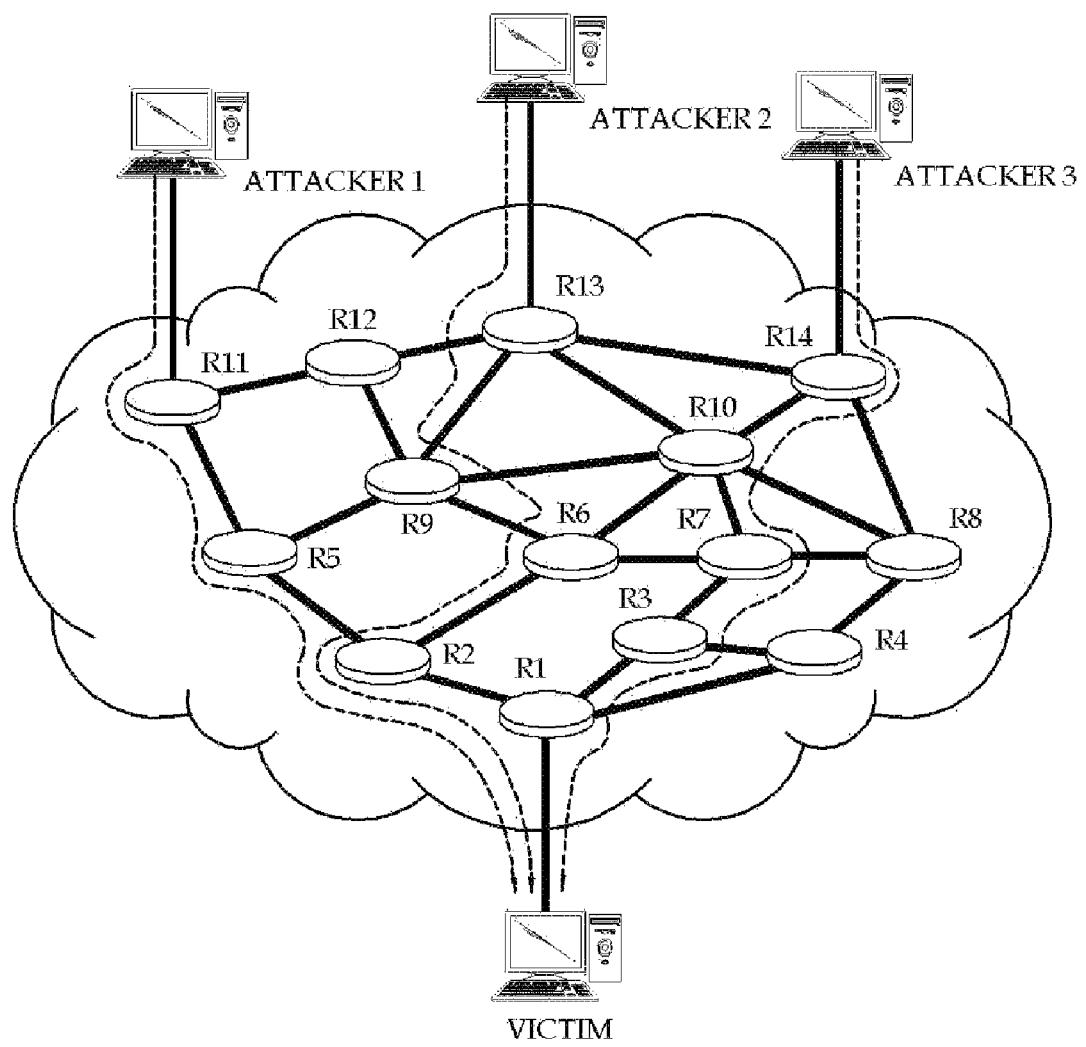
FIG. 1 shows an examplary attack type of distributed denial of services (DDoS) made on a victim's host on a network.
Figure 2:
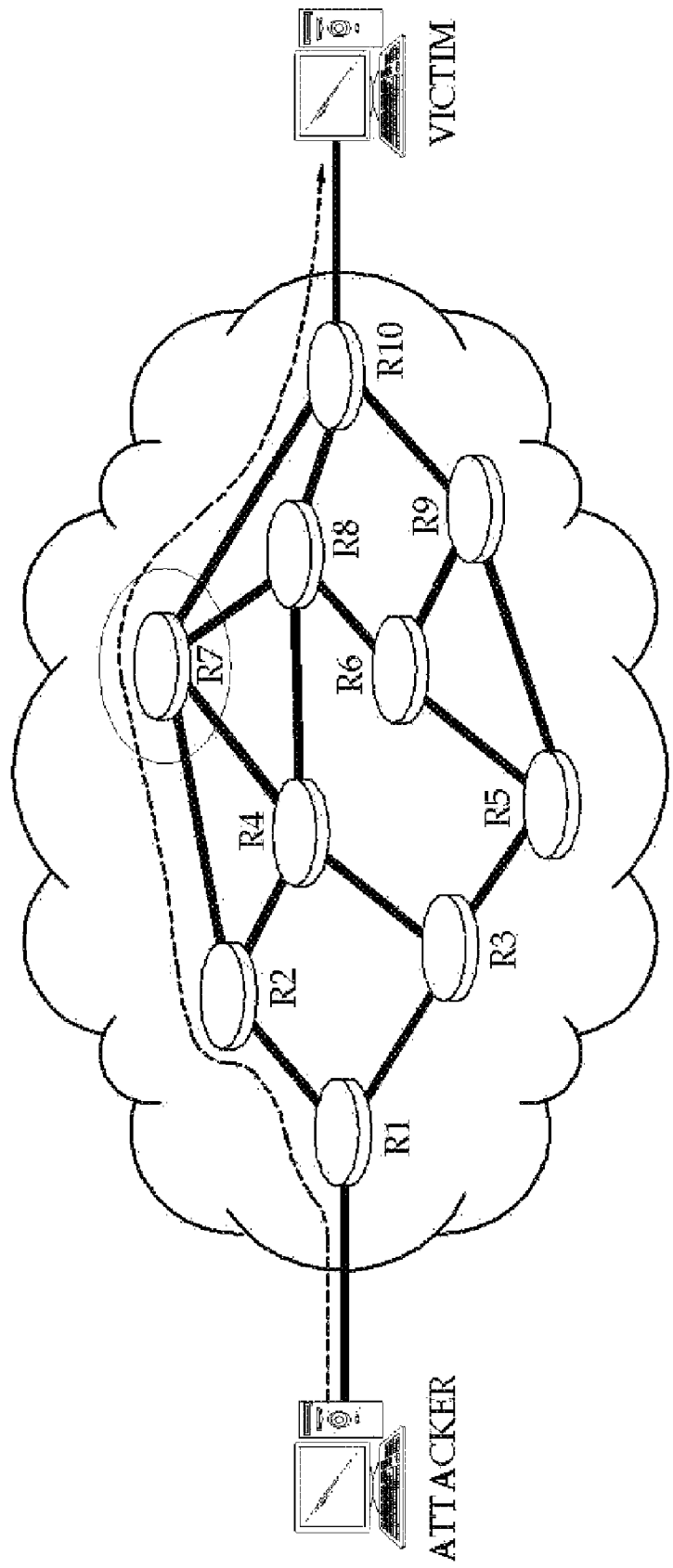
FIG. 2 is a view illustrating an IPv4 network used for explaining PPM.
Figure 3:
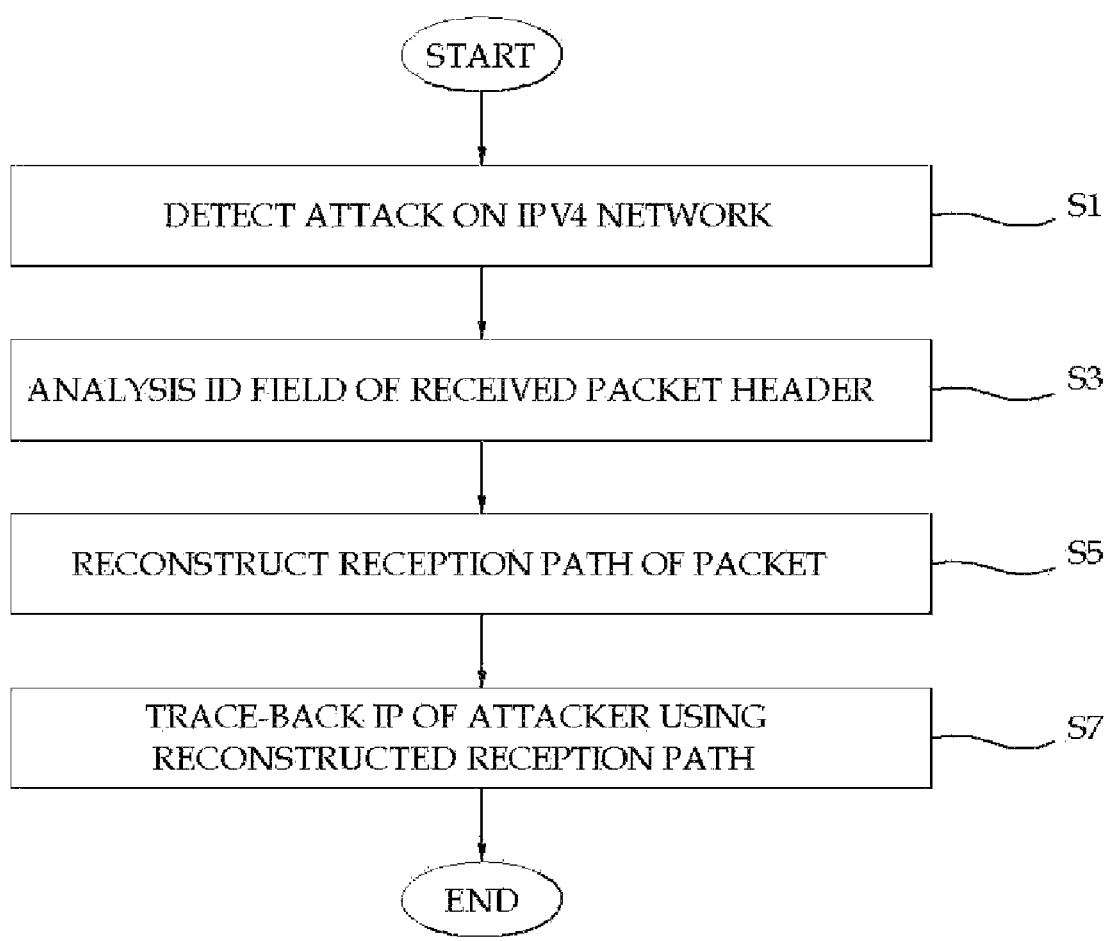
FIG. 3 is a flowchart explaining a method for tracing-back an attacker's IP on an IPv4 network using PPM.
Figure 4:
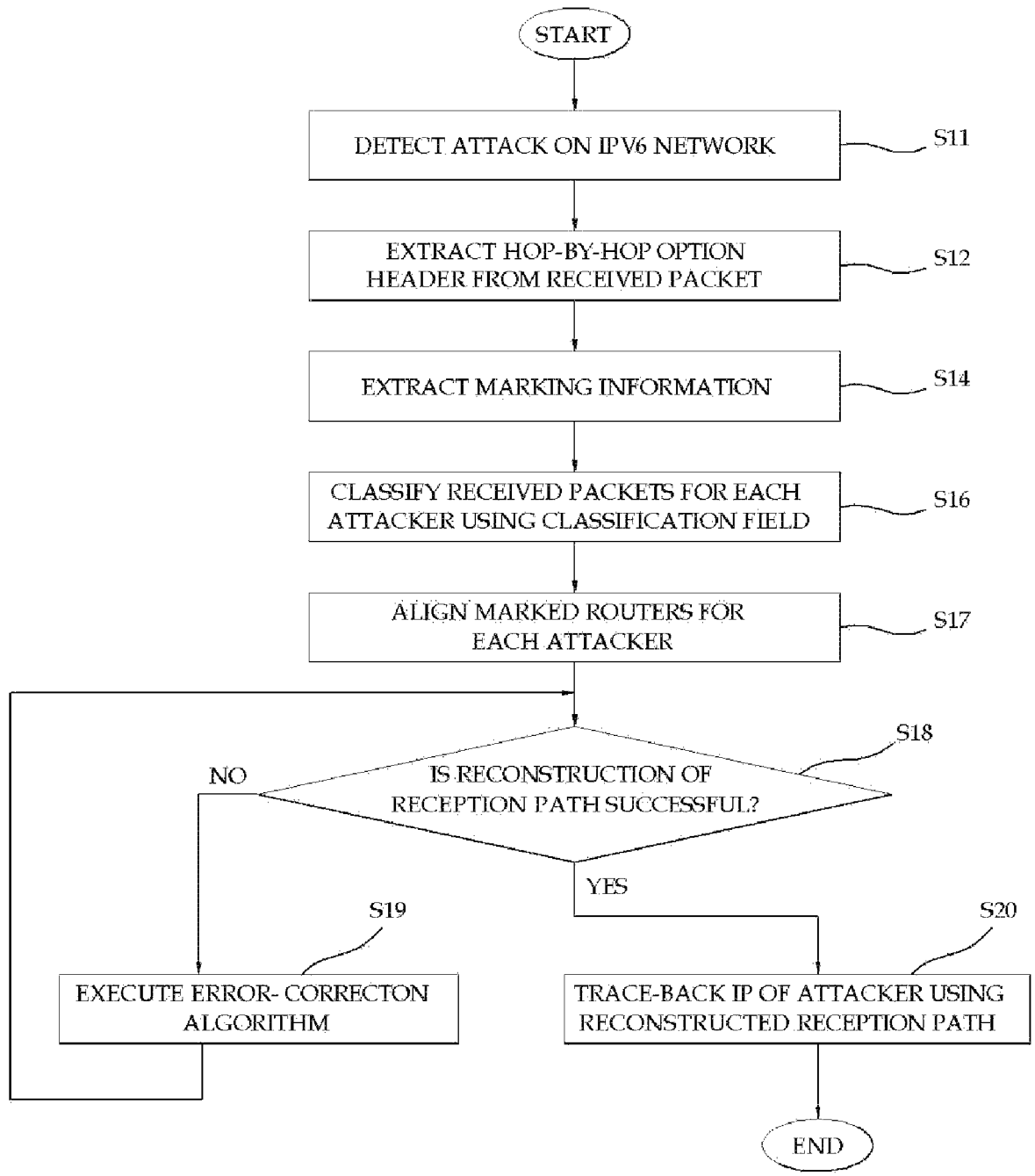
FIG. 4 is a flowchart explaining a method for tracing-back an attacker's IP on an IPv6 network according to an embodiment of the present invention.

FIG. 4 is a flowchart explaining a method for tracing-back an attacker's IP on an IPv6 network according to an embodiment of the present invention.

Referring to FIG. 4, an attack made by an attacker on an IPv6 network is detected (operation 11). The attack made by the attacker may be one of DoS and DDoS. When one of DoS and DDoS is made, an amount of packets received from the attacker to a victim's host explosively increases instantly. Therefore, a router to which the victim's host is connected fails due to a traffic increase and thus the victim's host does not properly receive a packet.

When an attack is detected through an instant and explosive increase in the received packets, a hop-by-hop option header is extracted from a packet received before the router fails (operation 12). A structure of a hop-by-hop option header is illustrated in FIG. 5 according to an embodiment of the present invention.

Figure 5A:
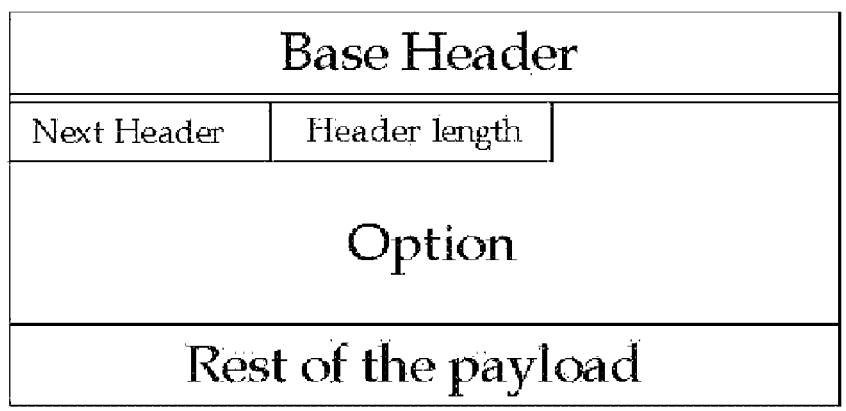
FIGS. 5A and 5B are views illustrating a structure of a hop-by-hop option header according to the present invention.
Figure 5B:
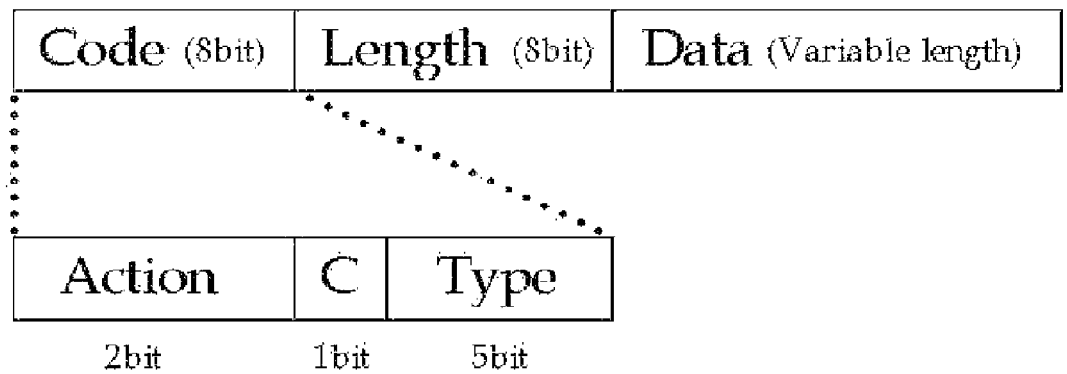

FIG. 5A illustrates an IPv6 header, and FIG. 5B illustrates a structure of a hop-by-hop option header, which is one of IPv6 extension headers. Referring to FIG. 5B, the hop-by-hop option header includes a code field, a length field, and a data field. A type field of the code field is set to a predetermined value for representing an IP tracing-back function. A more detailed structure of the data field is illustrated in FIG. 6.

Figure 6:
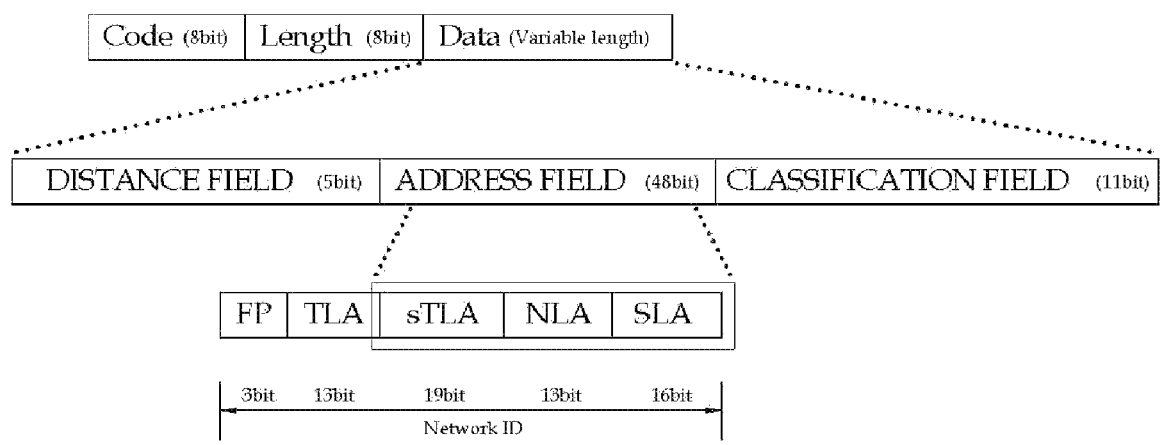
FIG. 6 is a detailed view of a data field according to the present invention.

Referring to FIG. 6, the data field includes a distance field representing distance information from a router that perform marking to a victim's host, an address field representing an address of marking point, and a classification field representing an interface ID of a source address of a received packet. The distance field is 5 bits, the address field is 48 bits that excludes FP(format prefix) and TLA (top-level aggregation) among network IDs of a router that performs marking, and the classification field is 11 bits obtained by encrypting and hashing an interface ID of the source address of the received packet. Since only three values of 3ffe, 2001 and 2002 are used for FP and TLA among the network IDs, absence of 16 bits contained in FP and TLA does not have a great influence on identification of a router.

Referring again to FIG. 4, marking information is extracted from the hop-by-hop option header (operation 14). A distance field, an address field, and a classification field marked in the data field of the hop-by-hop option header are extracted. Received packets are classified for each attacker's host using the extracted classification field (operation 16).

Figure 7:
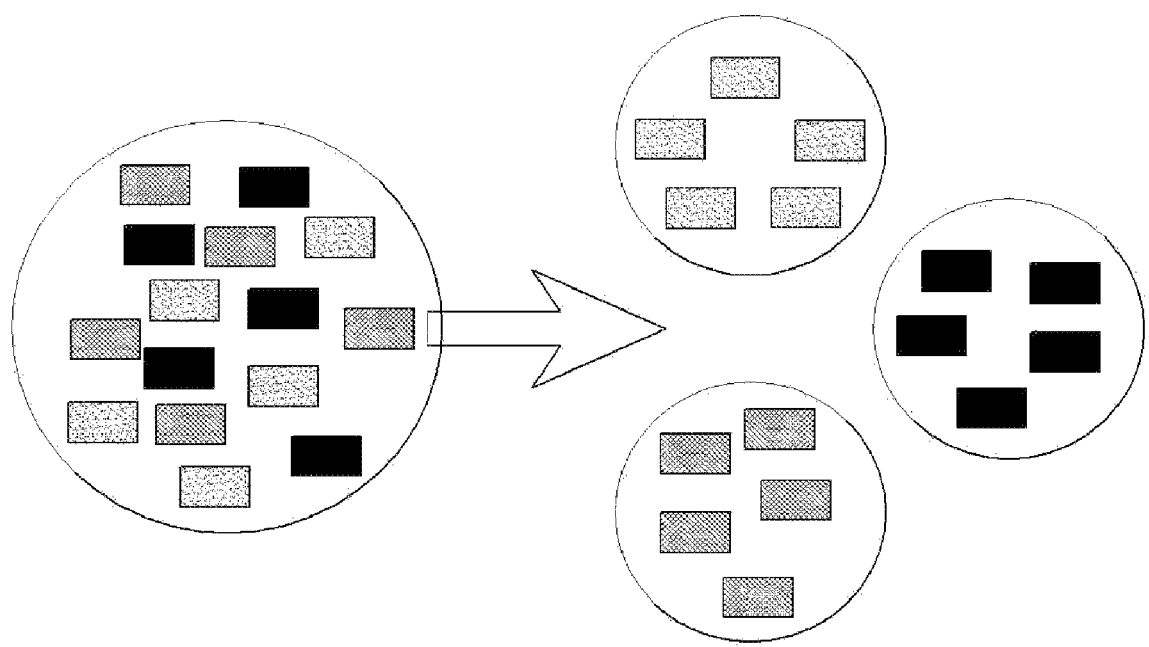
FIG. 7 is a view illustrating an example of a received packet classified using a classification field.

FIG. 7 is a view illustrating an example of a received packet classified using a classification field. For example, when packets are received from three attacker's hosts 1 to 3, the attackers are classified using interface IDs of source addresses of respective packets that are stored in data fields of the received packets.

Referring again to FIG. 4, routers that have performed marking are aligned in a distance order using distance fields of the received packets classified for each attacker (operation 17). A distance value marked on the distance field represents a difference between a hop-limited value of a packet and a unique hop value of each router at a reconstruction point. The hop-limited value increases by one whenever a router through which a packet is transmitted is hopped. Therefore, when routers are aligned using the marked distance values, a larger distance value means the marking router is located more closely to the attacker's host.

When marking routers are aligned in a descending order using distance values contained in the distance field, an address of an aligned router located at an endmost position, that is, a router judged as being closest to a victim's host is compared with a network ID of an adjacent router. When the address is the same as the network ID, the router is selected as one of routers on a reception path. Next, an address of another router judged as being closet to the victim's host is compared with a network ID of an adjacent router and selected as a next router on the reception path. Such a process is repeated up to an aligned router located at a frontmost position to reconstruct the reception path.

Whether the reconstruction of the reception path has been successful is judged through alignment of the marking routers for each attacker (operation 18). When the reconstruction of the reception path has been successful, an IP of an attacker is back-traced through the reconstructed reception path (operation 20).

Figure 9:
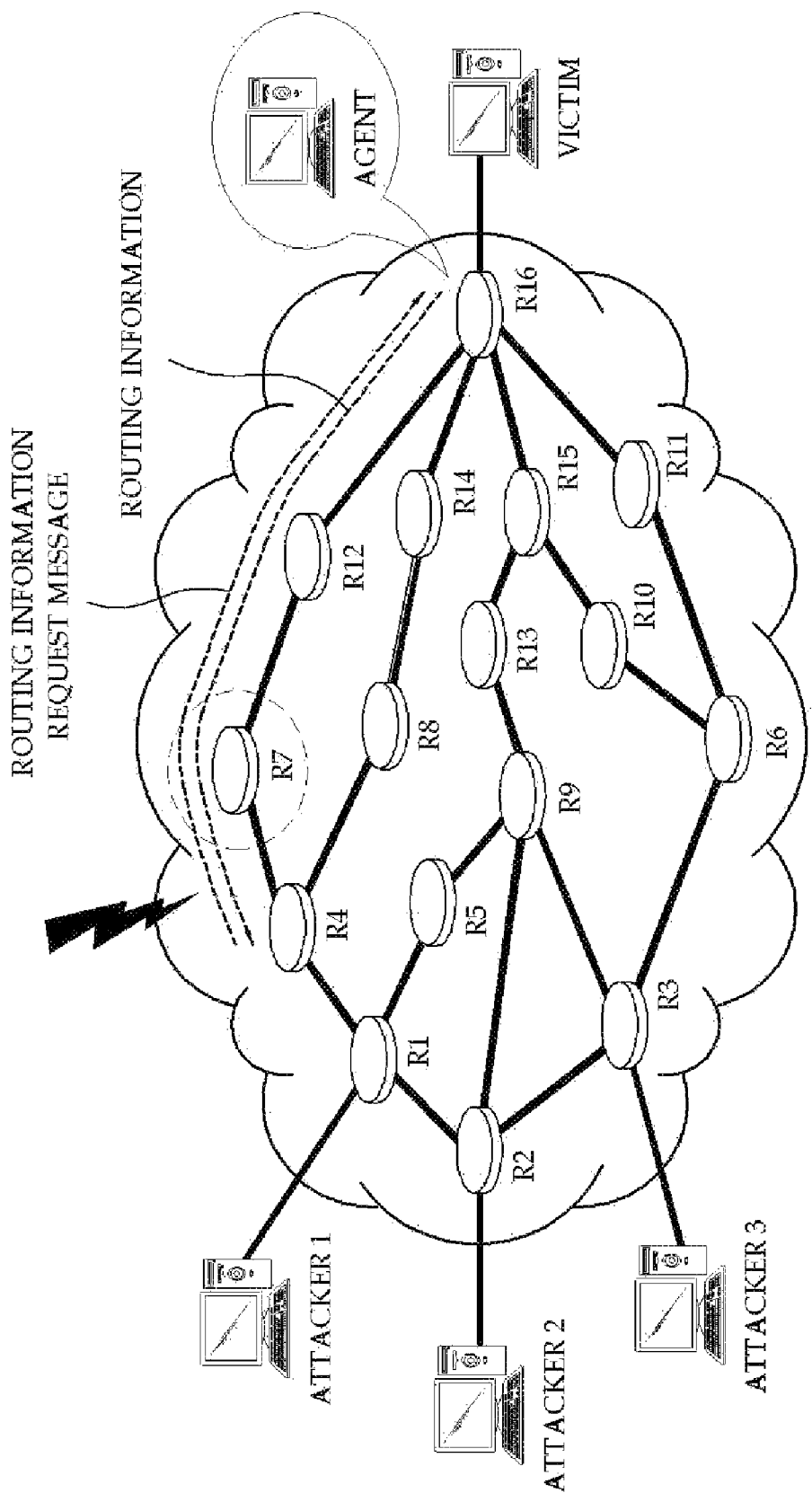
FIG. 9 is a view illustrating a system explaining an error-correction algorithm when reconstruction of a reception path fails.

On the other hand, when the reconstruction of the reception path has not been successful, an error-correction algorithm is executed to receive information of routers not marking and a reception path of packets is reconstructed again (operation 19). In case of PPM, when a marking probability of each router through which a packet passes increases, a probability that reconstruction of an accurate path is achieved increases. However, when packets that pass through a router and on which information is marked increase, performance of a network rather reduces. Therefore, it is required to determine a marking probability at a proper level. For this reason, when the marking probability decreases and thus distance values contained in the distance fields are not continuous, the reconstruction of the path is not achieved completely. Referring to FIG. 9, since marking information for a router R7 is absent, a path between a router R4 and a router R12 is not known. The error-correction algorithm is required during the reconstruction of the path to solve this problem.

Figure 8:
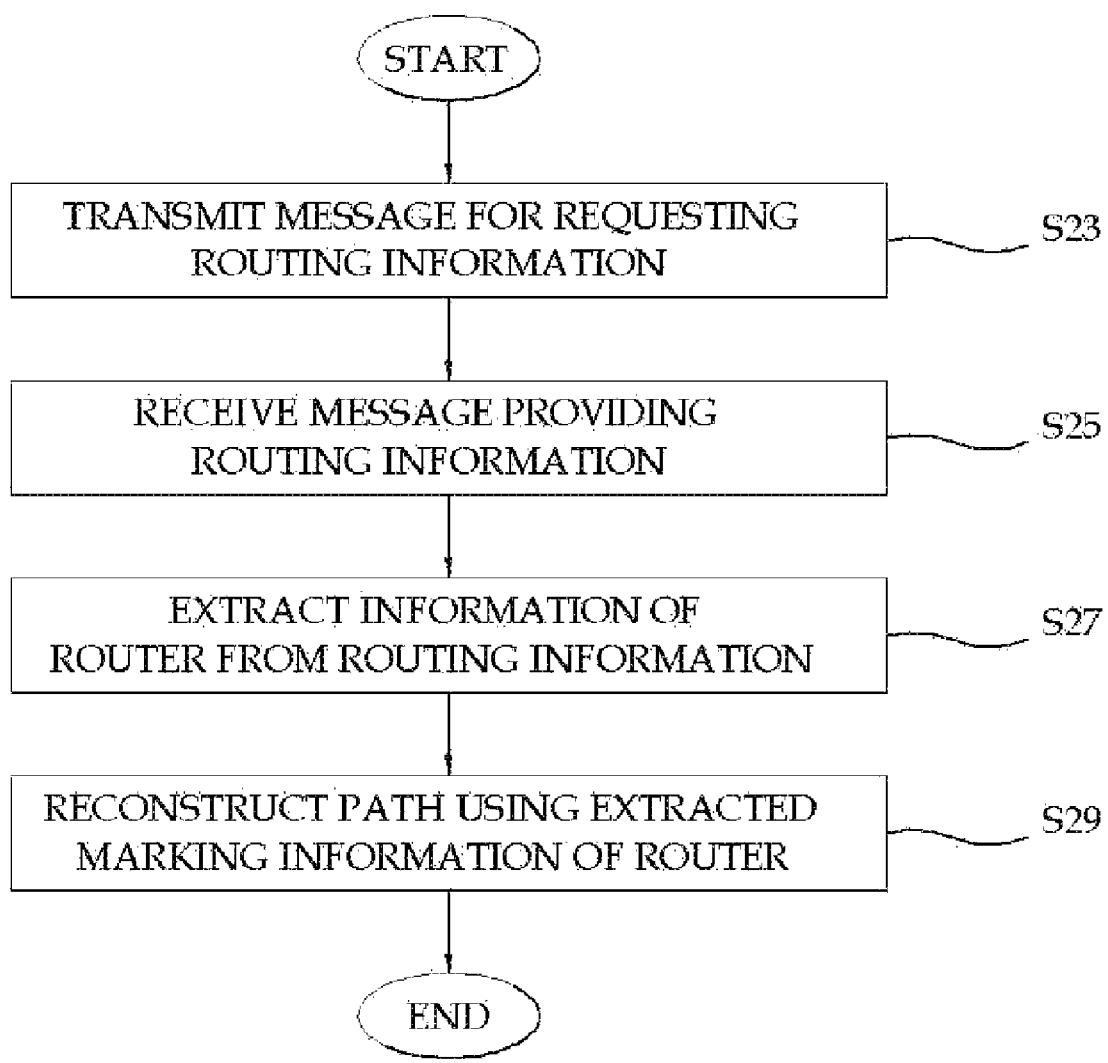
FIG. 8 is a flowchart explaining in more detail an error-correction algorithm according to the present invention.

FIG. 8 is a flowchart explaining in more detail an error-correction algorithm according to the present invention. Referring to FIG. 8, during the reconstruction of the reception path, a message for requesting an information regarding router not marked is transmitted to an adjacent router (operation 23). For example, when the marking information for the router R7 is absent as illustrated in FIG. 9, an agent of the victim's host transmits a message for requesting a routing information regarding the router R7 (i.e., routing information request message) to the router R4.

In response to the routing information request message, the router R4 transmits a routing information including information regarding a next router to which a packet is hopped from the router R4 and a final destination address to which the packet is transmitted, to the agent of the victim's host on the basis of a routing table recorded in the router R4(operation 25).

Information regading the next router is extracted from the transmitted routing information (operation 27) so that the reception path from the router R4 to the router R12 is reconstructed using information regading the next router (operation 29).

A method of tracing-back an IP according to the present invention can reconstruct a reception path of a packet and back-trace an IP of an attacker using information marked on a hop-by-hop option header, which is an IPv6 extension header.

Also, even when a router not marked is present, routing information of the router not marked is received and a reception path can be reconstructed using an error-correction algorithm.

Figure 10:
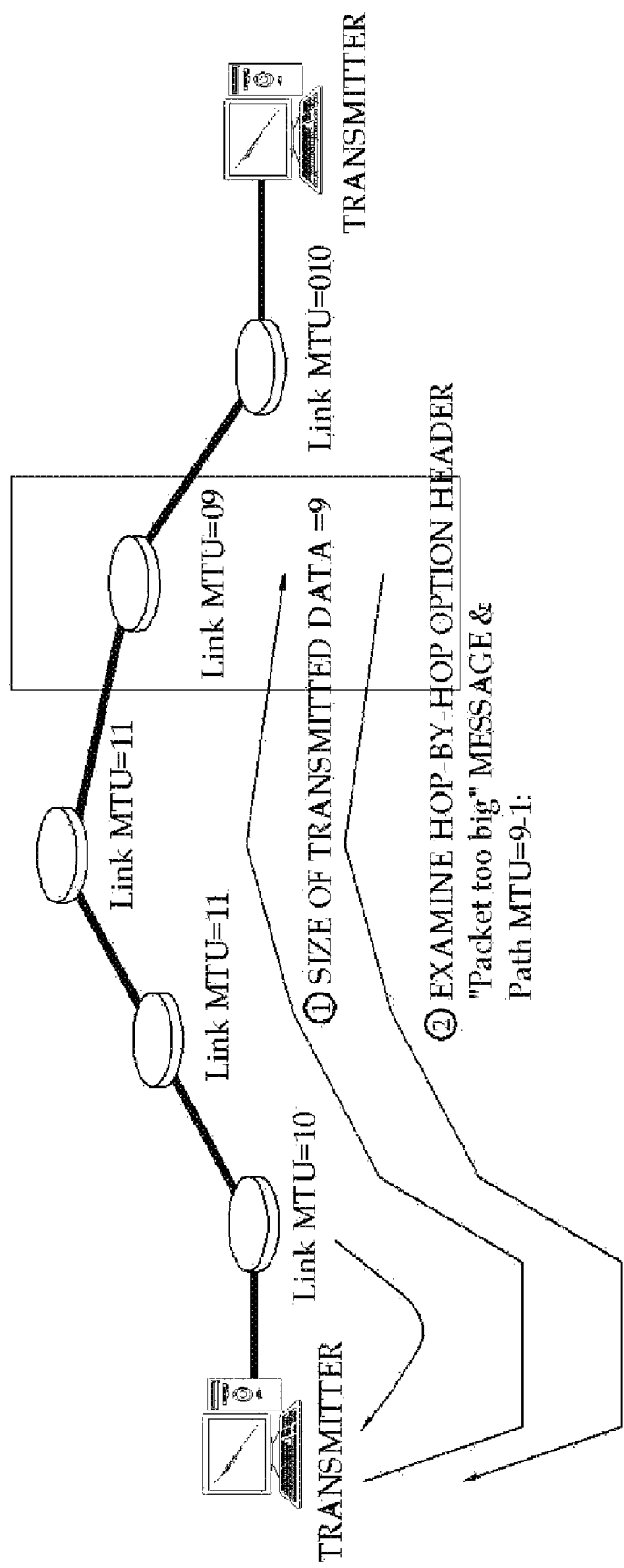
FIG. 10 is a schematic view illustrating a network explaining PMTUD according to an embodiment of the present invention.

FIG. 10 is a schematic view illustrating a network explaining path maximum transitions unit discovery (PMTUD) according to an embodiment of the present invention. When a packet that exceeds a data transmission capacity of each router is transmitted, a router of an IPv4 network divides a capacity of the packet and transmits divided packet. However, unlike a router of the IPv4 network, a router of an IPv6 network cannot perform a packet dividing function. Therefore, when an attacker transmits data that corresponds to a value allowed by a PMTU, a packet to which marking information of a router is added is dropped by the PMTU.

According to a PMTUD method of the present invention, a packet is transmitted after a storage space of a hop-by-hop option header is subtracted from the packet. When a packet is not successfully transmitted and is returned, a size of the PMTU that is properly transmitted is determined by gradually reducing the size of the PMTU. A host of a transmitter creates and transmits a packet including only data that corresponds to an amount obtained by subtracting a size of a hop-by-hop option header from the determined size of the PMTU.

FIG. 11 is a flowchart explaining in more detail a method for receiving a packet used for tracing-back a reception path according to PMTUD.

Referring to FIG. 11, a router to which a victim's host is connected receives a packet from an attacker (operation 31). Whether a hop-by-hop header is present in the received packet is judged (operation 33). When an attack from an attacker is detected on an IPv6 network, the hop-by-hop option header is extracted from the packet containing the hop-by-hop option header to reconstruct a reception path (operation 35). On the other hand, a packet not containing the hop-by-hop option header is dropped (operation 37).

On the other hand, the embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), and storage media such as carrier waves (e.g., transmission through the Internet).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for tracing-back an IP on an IPv6 network, the method comprising:
   detecting an attack made by an attacker on the IPv6 network;
   if the attack is detected, extracting marking information marked by a marking router through which the packet has passed and stored on a hop-by-hop option header of a packet received through the IPv6 network;
   classifying received packets for each attacker using interface IDs of source addresses of received packets;
   aligning the marking router in the classified packets for each attacker using the address of the marking router contained in the address field and the distance contained in the distance field;
   comparing the address of the aligned marking router with a network ID of an adjacent router;
   if the address of the aligned marking router is same as the network ID;
      selecting the aligned marking router as a router on a reception path; and
      reconstructing a reception path of the received packets with the selected aligned marking router and tracing-back an IP of the attacker using the extracted marking information and the aligned marking router;
   if the reception path of the received packet is not reconstructed:
      transmitting a request message for requesting routing information of a router whose marking information is not obtained;
      receiving the routing information of the router that is transmitted in response to the request message; and
      reconstructing a reception path using the received routing information;
   wherein the hop-by-hop option header includes a code field, a length field, and a data field, and an option value representing an IP tracing-back contained in the code field; and
   wherein the marking information stored in the data field includes a distance field representing a distance from a router that performs marking to a host under attack, an address field representing an address of the router that performs marking, and a classification field representing an interface ID of a source address of the received packet.

2. The method of claim 1, wherein the routing information includes a destination address of a packet and a next hop router address stored in a router table of the router that has received the request message.

3. The method of claim 1, further comprising:
   if a size of the received packet is the same as a PMTU (path maximum transmission unit) of the reception path, judging whether a hop-by-hop option header is present in the received packet; and
   if the hop-by-hop option header is absent in the received packet, dropping the received packet.

4. The method of claim 1, wherein the data field includes a 5-bit distance field, a 48-bit address field that excludes a FP (format prefix) and TLA (top-level aggregation), and a classification field including an interface ID of a source address hashed with 11 bits.

* * * * *